Sept. 30, 1924. 1,509,918
W. B. WIESE
LOADER
Filed April 9, 1923 2 Sheets-Sheet 2
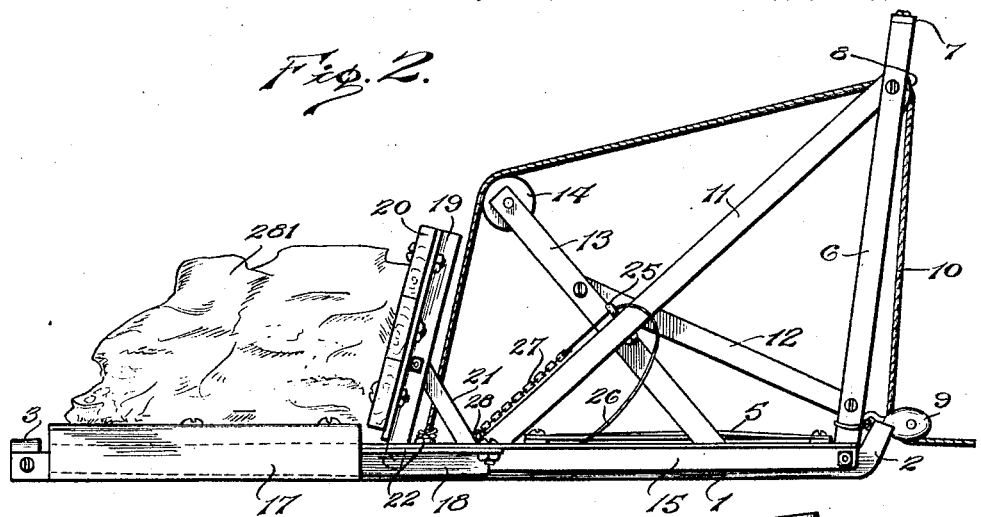
Fig. 2.
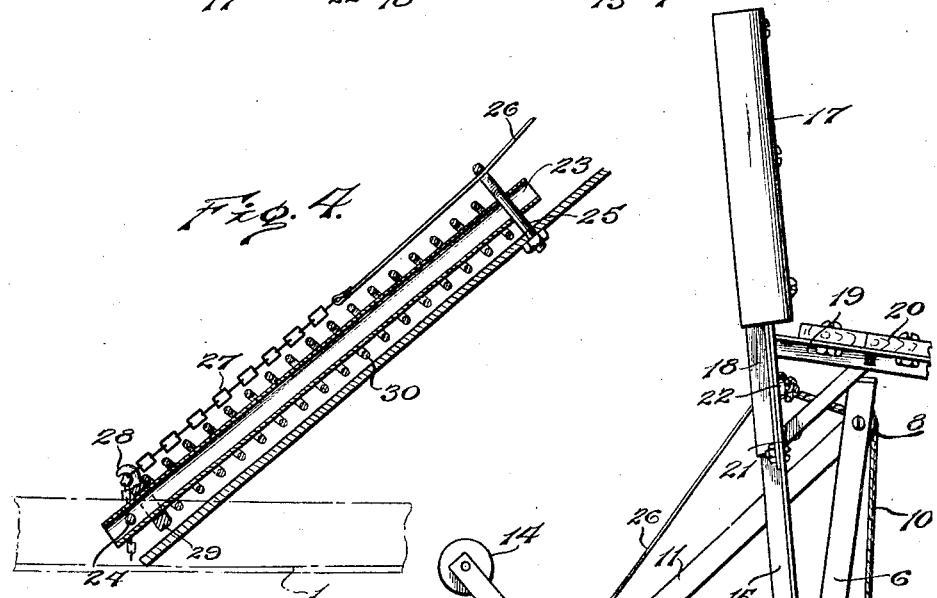
Fig. 4.
Fig. 3.
Inventor
W. B. Wiese
By Lacey & Lacey, Attorneys Patented Sept. 30, 1924.

1,509,918

UNITED STATES PATENT OFFICE.

WILLIAM B. WIESE, OF HOWELLS, NEBRASKA.

LOADER.

Application filed April 9, 1923. Serial No. 630,765.

*To all whom it may concern:*

Be it known that I, WILLIAM B. WIESE, a citizen of the United States, residing at Howells, in the county of Colfax and State of Nebraska, have invented certain new and useful Improvements in Loaders, of which the following is a specification.

This invention relates to loaders and is intended more particularly for use in transferring fertilizer from a stack or other source of supply to a wagon or fertilizer distributer for transportation to a point of use. The apparatus embodying my invention may, however, be used for transferring other material from a pile or other stock supply to a vehicle to be transported to some distant point as will, of course, be readily understood. One object of the invention is to provide a simple, compact and easily operated machine whereby a considerable volume of material may be raised from the ground or other point of supply and quickly delivered into a wagon box, while another object of the invention is to provide means whereby the throw of the material-carrying member will be cushioned and the said member will be readily returned to its initial position. Other incidental objects of the invention will appear in the course of the following description.

In the accompanying drawings:

Fig. 2 is a side elevation of the same showing the platform in its lowered position, Fig. 3 is a side elevation showing the platform raised to dumping position, and Fig. 4 is an enlarged longitudinal section of a cushioning device.

Figure 1:
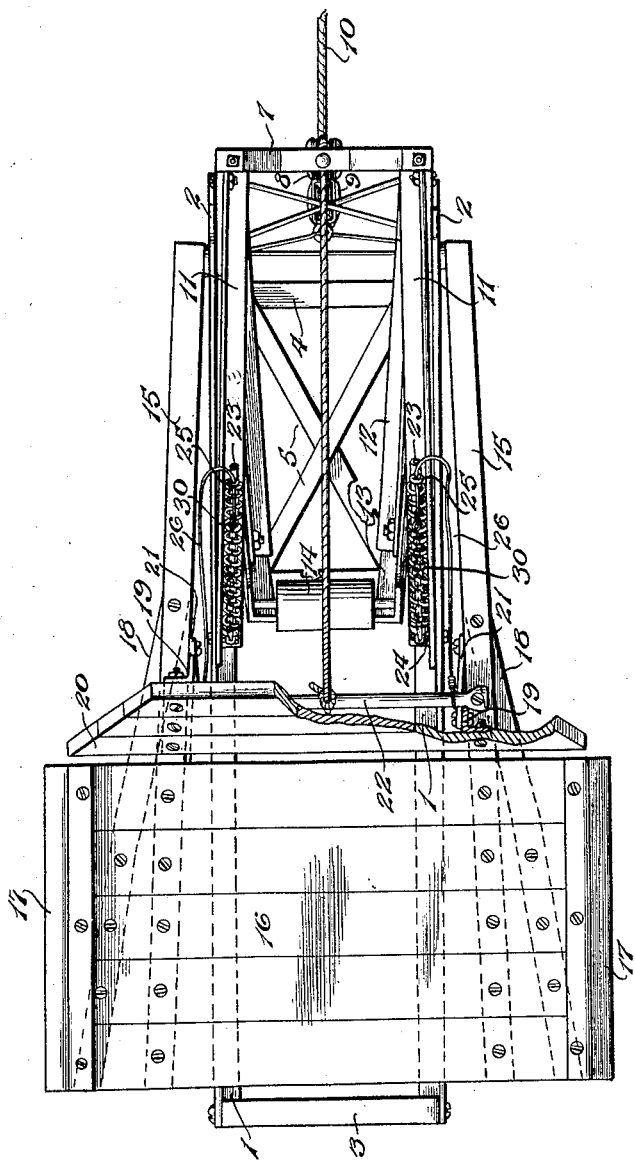
Figure 1 is a plan view of an apparatus embodying my invention.

In carrying out my invention, I employ a main frame consisting of parallel sills or runners 1 having their forward ends upturned, as shown at 2, whereby they may be easily drawn over the ground. At their rear ends, these sills or runners are connected by a cross bar or bridge 3 whereby they are prevented from spreading and at their front ends they are connected by a cross bar 4 and crossed braces 5, as will be readily understood, a rigid structure being thereby produced. Secured to the said sills and rising therefrom at the front ends thereof are uprights 6 which are preferably inclined slightly forwardly and are connected at their upper ends by a cross bar 7 whereby they constitute a derrick for supporting guide pulleys 8 and 9 over which the operating cable 10 is trained. Braces 11 are secured to the upper ends of the uprights 6 and extend rearwardly and downwardly therefrom to the sills so as to reinforce the structure, and extending upwardly and rearwardly from the said uprights 6 and the sills 1 are braces 12 and a spool-supporting frame 13 to which the said braces are secured, a spool or drum 14 being carried by the said frame 13, as shown. The frame 13 and the braces 12 are so disposed and of such dimensions that the spool or drum 14 will be located considerably in rear of and somewhat below the guide pulley 8, and the cable 10, when the platform is in its lowered position, will extend over the said spool or drum.

Pivoted to the sills 1 adjacent the forward upturned ends 2 of the same are the lever arms 15 which diverge rearwardly from the sills and upon the rear ends of which is secured the platform 16 which may be of any desired form and is illustrated as consisting of a plurality of transverse boards resting on and secured to the lever arms and projecting beyond the sides of the same. Flanges or inclined plates 17 are secured to the side edges of the platform 16 and depend therefrom so as to bear upon the ground when the platform is lowered, constituting guides or chutes up which the material may be drawn by a scraper, fork, or other device so as to be easily brought into position on the platform. Braces 18 are secured to the outer sides of the arms 15 in advance of the front edge of the platform, and these braces diverge rearwardly from the arms, as clearly shown in Fig. 1. I also secure upwardly extending supporting arms 19 to the levers 15, and to the said arms 19 I secure a back 20 which is similar in construction to the platform 16. Braces 21 are secured to the said supporting arms 19 and to the lever arms 15 so as to impart rigidity to the structure, and a cross rod or bar 22 is secured to and extends between the lever arms adjacent the lower ends of the supports 19, as shown most clearly in Fig. 1, the end of the cable 10 being secured to the said cross bar or rod 22, as clearly shown. Holders 23 are disposed longitudinally of the braces 11 and are secured at their lower ends to the sills 1 by the same bolts 24, which secure the braces to the sills. Eye-bolts 25 secure the upper ends of the holders to the braces 11 and cables or other flexible connections 26 pass through the eyes of said bolts and are each secured to the cross bar 22 at one end. The opposite end of each cable carries a chain 27, any link of which may be engaged over a hook 28 on the upper side of a collar or ring 29 which is slidably mounted on the adjacent holder 23, a spring 30 being coiled around the holder between said collar and the eye-bolt 25.

It is thought the operation of the device will be readily understood. The material to be loaded onto the wagons or other vehicles is deposited upon the platform 16, preferably by the use of a scraper, and rests against the back 20, as indicated at 281 in Fig. 2. After a load has been accumulated upon the platform, a pull is exerted through the cable 10 on the platform and the platform is thereby swung upwardly and forwardly so that the load will be raised until the platform assumes the position shown in Fig. 3, whereupon the load will slide over the back 20 onto or into the vehicle which has been brought into position to receive the same. It will be readily understood that the spool or drum 14 and the guide pulleys 8 and 9 are so arranged that the pull upon the cable 10 operates upwardly upon the platform and then forwardly so that the platform is swung about the pivotal connections of the lever arms 15 with the sills 1. When the platform is in its lowered position, the flexible connections 26 will be collapsed or folded, as indicated in Figs. 1 and 2, but, as the platform rises, the ends of the said connections which are secured to the cross bar or rod 22 will be carried upwardly and forwardly with the platform and, consequently, the said connections will be straightened and will then exert a direct compressing pull on the springs 30. As a result of this action, the upward and forward swinging movement of the platform will be checked and the momentum of the load will carry it off the platform and the back 20 without requiring the platform or the frame carrying the same to come into contact with any of the parts of the supporting structure so that breakage of the parts will be eliminated. The load will be discharged instantly upon the platform reaching its highest point, and, when the cable 10 is relaxed, the expansion of the springs 30 will effect return movement of the platform and the levers carrying the same, it being necessary only to permit the cable to follow the return movement without being released so that the descent of the platform will not be so rapid and violent as to cause breakage of any of the parts of the same. It will be readily understood that by engaging the proper chain links on the hooks 28 the force exerted by the springs 30 may be regulated.

My improved apparatus is very simple and compact and may be easily operated without requiring skilled labor.

Having thus described the invention, what is claimed as new is:

1. A loader comprising a base, an upright at one end of the base, braces secured to and extending between the upper end of the upright and the sides of the base, a frame rising from the base between said braces, a roller mounted at the upper end of said frame, lever arms pivoted to the base, a platform carried by the free ends of said arms, a back carried by the arms in cooperative proximity to the platform, a cross bar connecting said arms adjacent the back, guide rollers on the upright adjacent the upper and lower ends of the same, a hoisting cable secured to the cross bar and passing over the first-mentioned roller and about the guide rollers on the upright, and yieldable extensible connections between the braces and the cross bar.

2. A loader comprising a base, an upright at one end of the base, braces connecting the base and the upright, a swinging frame pivoted to the base, a platform carried by the swinging frame, a hoisting cable attached to the swinging frame and trained through guides on the upright, holders upon the braces extending longitudinally thereof, springs coiled around said holders, guides at the upper ends of the holders constituting abutments for the upper ends of the springs, collars slidably mounted on the holders and constituting abutments for the lower ends of the springs, hooks on said collars, flexible connecting members attached to the swinging frame and passing through said guides, and elements attached to said connecting members and engaged with said hooks.

In testimony whereof I affix my signature.

WILLIAM B. WIESE. [L. S.]